United States Patent [19]

Ebi

[11] Patent Number: 4,472,722

[45] Date of Patent: Sep. 18, 1984

[54] INK JET PRINTING METHOD

[75] Inventor: Yutaka Ebi, Kanagawa, Japan

[73] Assignee: Ricoh Company, Ltd., Japan

[21] Appl. No.: 532,295

[22] Filed: Sep. 14, 1983

Related U.S. Application Data

[63] Continuation of Ser. No. 234,954, Feb. 17, 1981, abandoned.

[30] Foreign Application Priority Data

Feb. 18, 1980 [JP] Japan .................................. 55-18889

Mar. 18, 1980 [JP] Japan .................................. 55-34634

[51] Int. Cl.³ .............................................. G01D 15/8

[52] U.S. Cl. ........................................ 346/1.1; 346/75

[58] Field of Search .................................... 346/1.1, 75

[56] References Cited

U.S. PATENT DOCUMENTS 3,769,631 10/1973 Hill et al. .............................. 346/75

3,813,676 5/1974 Wolfe .................................... 346/75

4,034,379 7/1977 Berry .................................. 346/75 X 4,054,882 10/1977 Ruscitto ............................ 346/75 X

*Primary Examiner*—G. Z. Rubinson

*Assistant Examiner*—W. J. Brady

*Attorney, Agent, or Firm*—Guy W. Shoup; Eliot S. Gerber

[57] ABSTRACT

An ink jet printing method by means of an electrostatic type ink jet printing apparatus, in which charging stages forming one scanning line on a recording sheet paper are divided into groups, ink droplets for printing each group being so charged that they impinge on the scanning line at intervals of a predetermined number of stages, the groups having starting stages different from each other, which results in that the influence of the aerodynamic resistance due to the preceding ink droplets on the ink droplet concerned and that of the Coulomb's force due to the preceding and neighboring ink droplets on the ink droplet concerned are suppressed to the minimum and, consequently, the quality of printing is considerably improved.

5 Claims, 9 Drawing Figures

FIG. 4

(M=60, N=12)

ONE SCANNING LINE

| | | | | | | | | | |
|---|---|---|---|---|---|---|---|---|---|
| 1ST GROUP | ⑤~K | 10 | 15 | 20 | 40 | 45 | 50 | 55 | 60 |
| 2ND GROUP | ②~L | 7 | 12 | 17 | 37 | 42 | 47 | 52 | 57 |
| 3RD GROUP | ④~P | 9 | 14 | 19 | 39 | 44 | 49 | 54 | 59 |
| 4TH GROUP | ①~Q | 6 | 11 | 16 | 36 | 41 | 46 | 51 | 56 |
| 5TH GROUP | ③~R | 8 | 13 | 18 | 38 | 43 | 48 | 53 | 58 |
| | 5 | 10 | 15 | 20 | 40 | 45 | 50 | 55 | 60 |

FIG. 5

(M=60, N=6)

ONE SCANNING LINE

| | | | | | | |
|---|---|---|---|---|---|---|
| 1ST GROUP | ⑩~K | 20 | 30 | 40 | 50 | 60 |
| 2ND GROUP | ⑤~L | 15 | 25 | 35 | 45 | 55 |
| 3RD GROUP | ②~$P_1$ | 12 | 22 | 32 | 42 | 52 |
| ' | 7 | 17 | 27 | 37 | 47 | 57 |
| ' | 4 | 14 | 24 | 34 | 44 | 54 |
| ' | 9 | 19 | 29 | 39 | 49 | 59 |
| ' | 6 | 16 | 26 | 36 | 46 | 56 |
| ' | 1 | 11 | 21 | 31 | 41 | 51 |
| ' | 8 | 18 | 28 | 38 | 48 | 58 |
| 10TH GROUP | 3 | 13 | 23 | 33 | 43 | 53 |

INK JET PRINTING METHOD

This application is a continuation of my copending application Ser. No. 234,954, filed Feb. 17, 1981, and now abandoned.

BACKGROUND OF THE INVENTION

The present invention relates to an improved ink jet printing method by means of an ink jet printing apparatus including an ink ejection means for ejecting ink through a nozzle into an ink jet which is broken into ink droplets, charge electrode means for charging the ink droplets in response to printing signals, deflection electrode means for deflecting the charged ink droplets and recording medium conveying means for conveying a recording medium upon which said charged ink droplets impinge in order to form an image.

In general, as to the afore-mentioned electrostatic type ink jet printing apparatus, the respective ink droplets are charged and deflected in order and dots-printing on the recording paper is performed, the respective ink droplets causing flows of air behind them. When a following ink droplet enters into the flow of air, the preceding ink droplet and the following ink droplet approach to each other or are combined into one droplet because the aerodynamic resistance acting on the following ink droplet becomes smaller than that acting on the preceding ink droplet. In consequence, distortion of printed image may be caused.

Moreover, as the respective ink droplets for printing are charged by the amount in response to the print or charging signal, the Coulomb's force (electrostatic repulsive force) works between the respective charged ink droplets and puts the distance from an ink droplet to the other out of order. As a result, distortion of printing may be caused. It is a decisive defect in the ink jet printing technology of the prior art.

SUMMARY OF THE INVENTION

In view of the above, a primary object of the present invention is to provide an ink jet printing method for improving the quality of printing by eliminating the influence caused by the afore-mentioned aerodynamic resistance variation and Coulomb's force. In particular, the afore-mentioned defect can be removed by devising the printing order of dot positions to be printed by the ink droplets.

Another object of the present invention is to provide an ink jet printing method for further improving the quality of printing by compensating the acrodynamic-resistance-distortion due to the preceding ink droplets and the Coulomb's-force-distortion due to the preceding charged ink droplets and the neighbouring charged ink droplets.

Other objects, together with the foregoing, are attained in the embodiments described in the following description and illustrated in the accompanying drawings.

BRIEF DESCRIPTION OF THE DRAWINGS

FIG. 4 is a diagram of the printing order for explaining the printing method of FIG. 2 shown in the form of numeral;

FIG. 5 is a diagram of the printing order for explaining a second embodiment of the printing method in accordance with the present invention shown in the form of numeral;

DESCRIPTION OF THE PREFERRED EMBODIMENTS

While the ink jet printing apparatus in accordance with the present invention is susceptible of numerous physical embodiments, depending upon the environment and requirements of use, substantial numbers of the herein shown and described embodiments have been made, tested and used, and all have performed in an eminently satisfactory manner.

Figure 1:
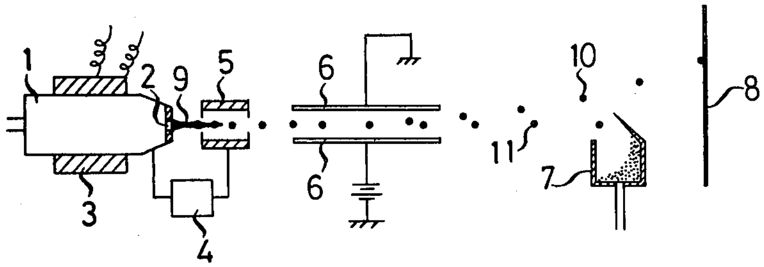
FIG. 1 is a view in explanation of an electrostatic type ink jet printing apparatus.

In FIG. 1, 1 shows an ink ejection head, 2 an orifice, 3 a piezo electric vibrator, 4 a print or charging signal generator, 5 a charging electrode, 6 a pair of deflection electrodes, 7 a gutter and 8 a sheet of recording paper.

As is well known, ink in the ink ejection head is pressurized and vibrated and then ejected through the orifice 2. The ink filament 9 thus ejected is broken into ink droplets in the charging electrode 5 that imparts an electric charge in response to the print information signal applied from the print or charging signal generator 4 to the respective separated ink droplets. The charged ink droplets 10 are deflected according to the charging amount of the charged ink droplets while passing through a pair of deflection electrodes 6 and impinge on a sheet of recording paper 8. On the other hand, the noncharged ink droplets 11 are not used for printing and captured by the gutter 7 and drawn back to an ink reservoir not shown in the figure in order to be used again.

Figure 2:
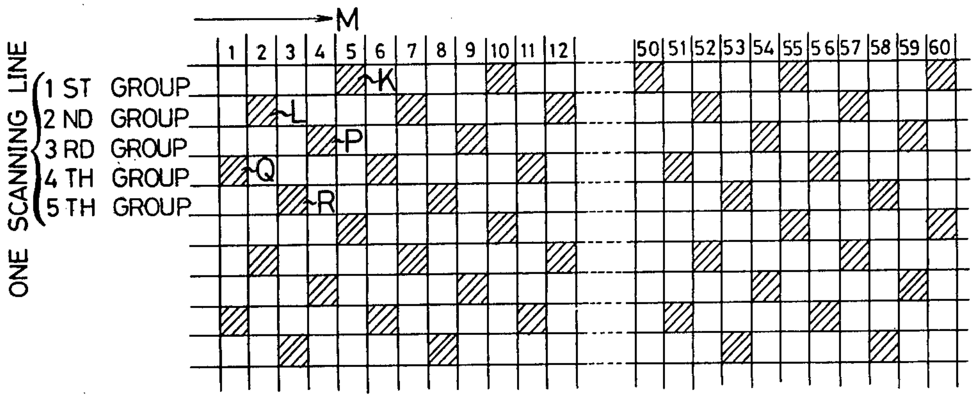
FIG. 2 is a diagram of the printing order for explaining a first embodiment of an ink jet printing method in accordance with the present invention.

FIG. 2 shows an embodiment of the printing method in accordance with the present invention. In the figure, the maximum number M of charging stages is sixty. The hatching portions show the charging stages which are expected to be printed by the ink droplets. The ink droplets charged by the charging electrode 5 reach the corresponding hatching portions and the other ink droplets which are not charged do not reach the corresponding hatching portions, but the gutter 7. As shown in FIG. 2, according to the present invention the order of printing by the ink droplets, that is, the arrangement of the hatching portions is so selected that the influence of the variation in the aerodynamic resistance by the preceding ink droplets and the Coulomb's force by the preceding and neighbouring charged ink droplets is minimized, instead of printing the charging stages 1~60 by the ink droplets in the normal order. Namely, as to the embodiment shown in FIG. 2, the maximum number of charging stage M equal to sixty which forms a scanning line is divided by an optional natural number N, wherein the number N is three or more, for example N=12 as shown in the figure, and the number M can be divided by the number N. And then, the maximum number of charging stage M is separated into the number of groups corresponding to the quotient K equal to M/N, for example, five as shown in the figure. The printing is performed in the order of the respective groups and the order of printing in the respective groups is selected as follows;

(i) As to the first group, starting from the charging stage corresponding to the quotient K or the number less than K, for example, five as shown in the figure, the ink droplets for printing the first group are so charged that they impinge on a scanning line of a recording sheet paper comprising the charging stages 1~60 at respective intervals of K stages (five stages).

(ii) As to the second group, starting from the middle stage L of the second group between the zero stage and the starting stage (fifth stage) in the first group, the ink droplets for printing the second group are so charged that they impinge on the same scanning line at respective intervals of K stages. When two middle stages exist in the columns 2 and 3, the stage 2 at a longer distance from the starting stage K (K=5) of the first group is selected as the starting stage L in the second group.

(iii) As to the third group, starting from the middle stage P between the starting stage K in the first group and the starting stage L in the second group, the ink droplets for printing the third group are so charged that they impinge on the same scanning line at respective intervals of K stages. When two middle stages exist in the column 3 and 4, the stage 4 at a longer distance from the starting stage L of the second group is selected as the starting stage P.

(iv) In like manner, as to the fourth group, starting from the charging stage Q at a longer distance from the starting stage P in the third group, the ink droplets for printing the fourth group are so charged that they impinge on the same scanning line at respective intervals of K stages, wherein the charging stage Q is the first stage of the scanning line in the embodiment shown in FIG. 2. In the final group (the fifth group) charging of the ink droplets for printing the final group starts at the remaining stage R.

The above-mentioned five groups form one scanning line. When the order of charging is selected in the afore-mentioned way, the respective charged ink droplets are hardly affected by the preceding charged ink droplets, or even if they are affected the extent of influence is considerably small. Consequently, the respective charged ink droplets fly just as in the independent state and in consequence distortion of printing caused by the aerodynamic resistance variation and/or the Coulomb's force can be eliminated.

FIG. 4 shows the printing order shown in FIG. 2 in the form of numeral. In the figure, the numerals 5, 2, 4, 1 and 3 correspond to K, L, P, Q and R in FIG. 2, respectively. In FIG. 5, another embodiment of the present invention is illustrated, in which the maximum number M is equal to sixty and the natural number N is equal to six, respectively. In this embodiment, the starting stage L (L=5) in the second group is situated just in the middle of the starting stage K (K=10) in the first group and the middle stage 2 of the starting stage 5 in the second group is selected as the starting stage P1 instead of selecting the middle stage 8 between the starting stage 10 in the first group and the starting stage 5 in the second group as the starting stage in the third stage, wherein two middle stages 2 and 3 exist between the zero stage and the starting stage 5 and the stage 2 at a longer distance from the starting stage 5 of the preceding group is selected as the starting stage of the third group. In like manner, the starting stages in the respective groups are selected as shown in the first column of FIG. 5, and the ink droplets for printing the respective groups are so charged that they impinge on the recording sheet paper at respective intervals K stages (K=10).

Figure 3:
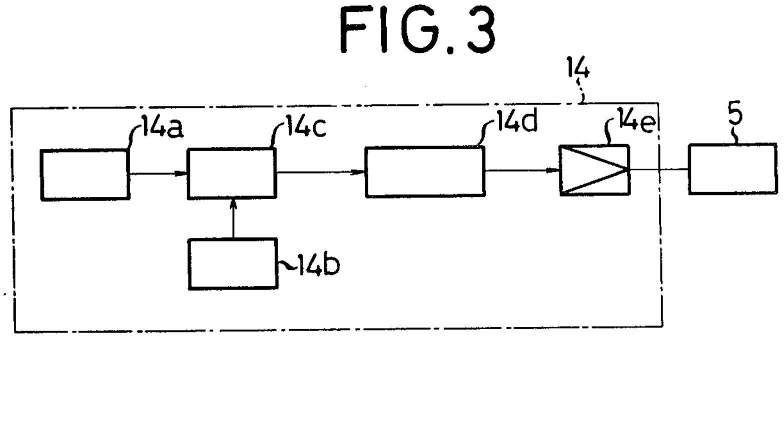
FIG. 3 is an electric circuit diagram of a print or charging signal generator for preferably carrying out the printing method in accordance with the present invention.

FIG. 3 is an electric circuit diagram of the print or charging signal generator 14 for carrying out the charging in the afore-mentioned order. In the figure, **14*a* is a print signal source, 14*b* a charging code generating circuit, 14*c* a printing order selecting circuit, 14*d* a charging distortion compensating circuit and 14*e* an amplifier. The output data from the print signal source 14*a* are rearranged by means of the printing order selecting circuit 14*c* into the order as shown in FIG. 4 or FIG. 5 and then the respective code signals from the charging code generating circuit 14*b* are set to the order as shown in FIG. 4 or FIG. 5**.

As is apparent from the foregoing descriptions, the respective charged ink droplets may be charged in the order such that they are hardly influenced by the aerodynamic resistance variation and/or the Coulomb's force due to the preceding or neighbouring charged ink droplets and in consequence high quality printed image can be reproduced with least printing distortion.

Figure 6:
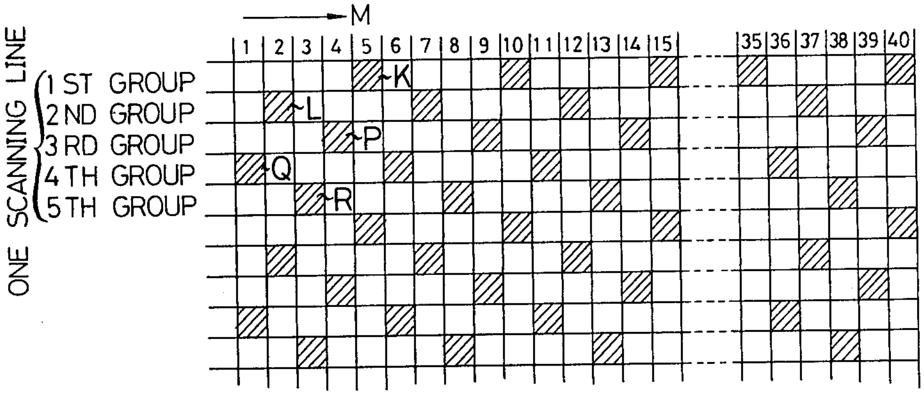
FIG. 6 is a diagram of the printing order for explaining a third embodiment of the printing method in accordance with the present invention.

FIG. 6 is another diagram of the printing order for explaining the printing method in accordance with the present invention, wherein the number of the maximum charging stages M is forty, the optional natural number N is eight, and in consequence the quotient H is equal to five. When the way of the ink droplet charging is selected as above-mentioned, the distortion due to the aerodynamic resistance variation and Coulomb's force by the preceding and neighbouring charged ink droplets can be considerably suppressed. But it is impossible to eliminate the influence of the preceding and neighbouring charged ink droplets to the minimum or completely. This problem can be solved according to the invention as follows.

Figure 7:
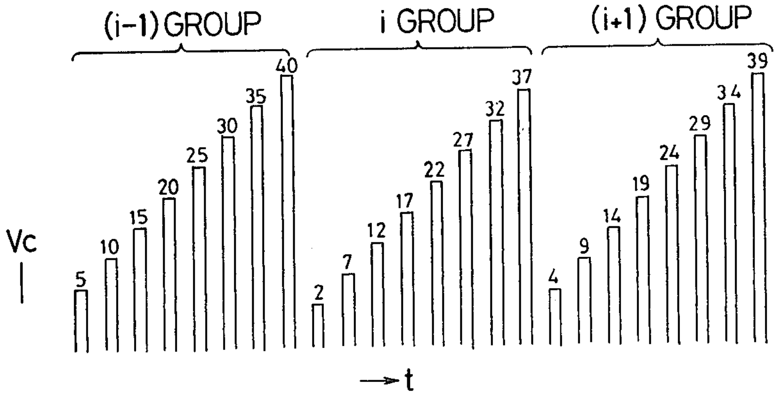
FIG. 7 is an electric circuit diagram of a print or charging signal generator for preferably carrying out the third embodiment of the printing method in accordance with the present invention.
Figure 8:
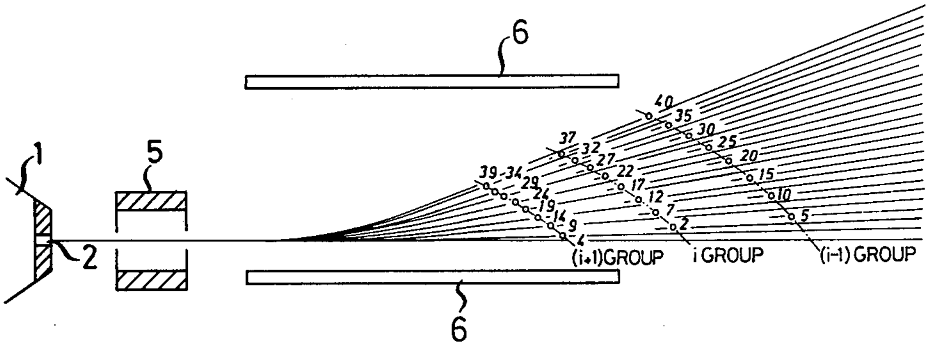
FIG. 8 is a view for explaining an exemplary flying state of charged ink droplets.

FIG. 8 is a view showing the flying orbits of the ink droplets charged in such a manner as mentioned before. FIG. 7 shows a method of applying the charging voltage to the charging electrode. As shown in FIG. 7, the (i−1)-th group is printed in the order of 5, 10, 15, . . . , 40, the i-th group is printed in the order of 2, 7, 12, . . . , 37, the (i+1)-th group is printed in the order of 4, 9, 14, . . . , 39, and so on, wherein each of the charged ink droplets in the i-th group is situated at the middle position of the charged ink droplets in the (i−1)-th group and each of the charged ink droplets in the (i+1)-th group is situated at the middle position of the charged ink droplets in the i-th group so that the charged ink droplets always mark dots in the middle position of the preceding charged ink droplets and in consequence the influence by the aerodynamic resistance variation and the Coulomb's force due to the preceding or neighbouring charged ink droplets is considered to be minimized. However, as to the charged ink droplet 17 in the i-th group as an example, the preceding ink droplets that exert a harmful influence of the aerodynamic-resistance-distortion upon the charged ink droplet 17 are 25, 20, 15, 10 etc. in the (i−1)-th group and then the charged ink droplets that exert a harmful influence of the Coulomb's-force-distortion upon the same charged ink droplet 17 are 32, 27, 22, 12, 7, 2 etc. in the i-th group. Consequently, when the ink droplet 17 is charged, whether the preceding and neighbouring charged ink droplets that produce an effect on the ink droplet 17 exist or not should be considered. When there are charged ink droplets which act on the ink droplet 17, the charging amount of the ink droplet 17 should be determined in consideration of the distortion amount due to these charged ink droplets so as to mark a dot of the ink droplet 17 precisely on a desired position. Supposing that the afore-mentioned compensation is performed for all charged ink droplets, they will be able to impinge precisely upon the desired position so that the quality of printing can be largely improved. In practice, for the purpose of simplifying the construction of device, only the ink droplets 20, 15, 22, 12 may be considered in regard to the ink droplet 17. The flow of air is so complicated that it is difficult to obtain an accurate compensating amount for the aerodynamic-resistance-distortion. The compensating amounts α1, α2 and α3 for the combination of presence or absence of the ink droplets 20 and 15 are memorized as to the aerodynamic-resistance-distortion, and as to the Coulomb's-force-distortion the compensating amounts β1 and β2 for the presence or absence of the ink droplets 22 and 12 only are memorized independently of the compensating amounts α1, α2 and α3 as shown in the table 1.

TABLE 1

| Ink Droplet To Be Charged | Aerodynamic-Resistance-Distortion | | | | | | Coulomb's-Force-Distortion | |
|---|---|---|---|---|---|---|---|---|
| 17 | 20 Presence | 15 Absence | 20 Absence | 15 Presence | 20 Presence | 15 Presence | 22 Presence | 12 Presence |
| | (α1) | | (α2) | | (α3) | | (β1) | (β2) |

Figure 9:
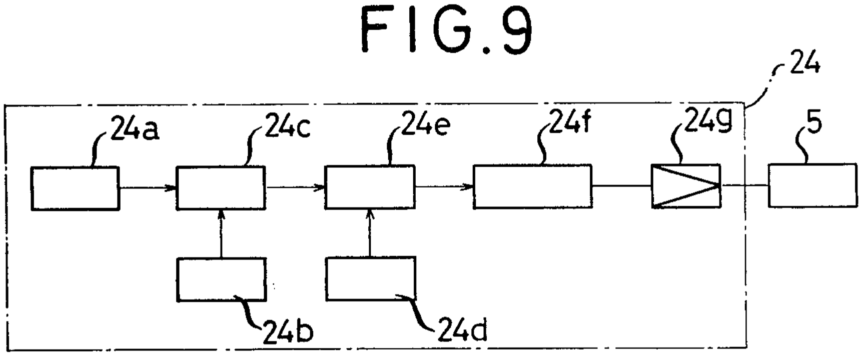
FIG. 9 is a figure showing an exemplary wave form of charging voltage.

FIG. 9 is a circuit diagram of the print or charging signal generator 24 for accomplishing the afore-mentioned embodiment of the present invention. In the figure, **24*a* is a print signal source, 24*b* a charging code generating circuit, 24*c* a printing order selecting circuit, 24*d* a distortion-compensating amount memory, 24*e* an adder for picking up the compensating amount from the distortion-compensating amount memory 24*d* and adding it to the charging signal from the printing order selecting circuit 24*c*, 24*f* a charging-distortion-compensating circuit and 24*g*** an amplifier.

The printing order selecting circuit **24*c* rearranges data from the print signal source 24*a* in the order as shown in FIG. 6. And then, the compensating amount memorized in the distortion-compensating amount memory 24*d* is added to the charging signal rearranged in the order such as mentioned before and the added signal is applied to the charging electrode 5 through the charging-distortion-compensating circuit 24*f* and the amplifier 24*g***.

As is apparent from the afore-mentioned illustrations, the respective charged ink droplets may fly practically without being influenced by the aerodynamic resistance variation due to the preceding ink droplets and the Coulomb's force due to the preceding and neighbouring charged ink droplets. Even if the respective charged ink droplets are influenced by the aerodynamic resistance variation and the Coulomb's force, the distortion can be effectively compensated according to the present invention, so that the quality of printing is considerably improved.

Various other embodiments will become possible for those skilled in the art after receiving the teachings of the present disclosure without departing from the scope thereof.

What is claimed is:

1. An ink jet printing method by means of an electrostatic type ink jet printing apparatus in which the ink is ejected through a nozzle of an ink ejection head and broken into droplets, said droplets are charged by charging electrode means and deflected by deflection electrode means, and finally dots are marked on a sheet of recording paper: characterized in that said ink droplets are charged in such a manner that the maximum charging stage number M is divided into groups where M>3, each group having the same number of droplets; and the charging is performed, in order from the first group to the final group; droplets for printing the first group being charged so that they impinge on the recording paper at respective intervals K; droplets for printing the second group and each subsequent group being charged so that they impinge on the recording paper also at respective intervals K and midway between the droplets of the preceding group.

2. An ink jet printing method by means of an electrostatic type ink jet printing apparatus in which the ink is ejected through a nozzle of an ink ejection head and broken into droplets, said droplets are charged by charging electrode means and deflected by deflection electrode means, and finally dots are marked on a sheet of recording paper: wherein said ink droplets are charged in such a manner that the maximum charging stage number M is divided into groups of number K, which number K is a quotient obtained by dividing said maximum charging stage number M by a natural number N (N≧3) and the charging is performed, in order from the first group to the final group; droplets for printing the first group being charged so that they impinge on the recording paper at respective intervals K starting from an optional stage which stage number is equal to or smaller than K; droplets for printing the second group being so charged that they impinge on the recording paper also at respective intervals K starting from a middle state L between the zero stage or the K-th stage and said optional stage, and droplets for printing the third group being so charged that they impinge on the recording paper at respective intervals K starting from the middle stage between said optional stage in the first group and said starting stage L in the second group; in case of charging an ink droplet adapted to print the n-th stage of the i-th group, it is judge whether ink droplets near to said ink droplet exist in the preceding (i−1)-th group, and the amount of the aerodynamic-resistance-distortion due to said ink droplets in the (i−1)-th group is considered for adding said amount as a compensating factor to the charging amount of said ink droplet corresponding to the n-th stage of the i-th group when there are such ink droplets in the (i−1)-th group, and it is further judged whether ink droplets near to said ink droplet exist in the i-th group and the amount of the Coulomb's-force-distortion due to said ink droplets in the i-th group is considered for adding said amount as a compensating factor to the charging amount of said ink droplet corresponding to the n-th stage of the i-th group when there are such ink droplets in the i-th group.

3. An ink jet printing method as defined in claim 2 wherein the said groups are of number K, which is a quotient obtained by dividing said maximum charging stage number M by a natural number N ($N \geqq 3$), and wherein the said respective intervals K start from an optional stage which stage number is equal to or smaller than K, droplets for printing the second group being so charged that they impinge on the recording paper also at respective intervals K starting from a middle stage L between the zero stage or the K-th stage and said optional stage, and droplets for printing the third group being so charged that they impinge on the recording paper at respective intervals K starting from the middle stage between said optional stage in the first group and said starting stage L in the second group.

4. An ink jet printing method as defined in claim 2 characterized in that in case of two middle stages between the zero stage or the K-th stage and the starting stage in the first group the middle stage at a longer distance from said optional stage is selected as the starting stage of the second group.

5. An ink jet printing method as defined in claim 2 characterized in that in case of two middle stages between the starting stages in the first group and in the second group the middle stage at a longer distance from said starting stage in the second group is selected as the starting stage of the third group.

* * * * *